United States Patent
Allen et al.

(10) Patent No.: US 6,423,755 B1
(45) Date of Patent: Jul. 23, 2002

(54) RIGID POLYURETHANE FOAMS

(75) Inventors: Mark P. Allen, Sterling Heighs; Roney J. Matijega, Lake Orion, both of MI (US)

(73) Assignee: Essex Specialty Products, Inc, Auburn Hills, MI (US)

(*) Notice: Subject to any disclaimer, the term of this patent is extended or adjusted under 35 U.S.C. 154(b) by 0 days.

(21) Appl. No.: 09/513,038

(22) Filed: Feb. 25, 2000

(51) Int. Cl.[7] .............................. C08G 18/10
(52) U.S. Cl. ............... 521/111; 521/112; 521/130; 521/131; 521/155; 521/172; 521/174
(58) Field of Search ............... 521/111, 112, 521/130, 131, 155, 172, 170, 174

(56) References Cited

U.S. PATENT DOCUMENTS

| | | | |
|---|---|---|---|
| 4,518,718 A | 5/1985 | Frost | 521/122 |
| 5,234,965 A | 8/1993 | Gott et al. | 521/116 |
| 5,532,280 A | 7/1996 | Allen et al. | 521/51 |
| 5,691,392 A * | 11/1997 | Okoroafor et al. | 521/112 |
| 5,817,860 A | 10/1998 | Rizk et al. | 560/25 |
| 6,221,929 B1 * | 4/2001 | Ryugo et al. | 521/114 |

FOREIGN PATENT DOCUMENTS

| | | |
|---|---|---|
| DE | 197 28 792 A1 | 1/1999 |
| EP | 0 341 210 | 4/1989 |

* cited by examiner

*Primary Examiner*—John Cooney

(57) ABSTRACT

Polyurethane foams containing a syntactic phase and a cellular, non-syntactic phase are useful as reinforcing foams, such as in automotive applications. The foams are conveniently made in the reaction of a high viscosity isocyanate-reactive component and a high-viscosity polyisocyanate component, at least one of which contains a plurality of hollow microspheres.

16 Claims, No Drawings

RIGID POLYURETHANE FOAMS

BACKGROUND OF THE INVENTION

The present invention relates to rigid polyurethane foams. More specifically, the present invention relates to novel rigid syntactic polyurethane foams that are particularly useful as reinforcement materials, especially in the auto industry.

Rigid foams have been used in the auto and other industries for a number of purposes. For example, rigid foams have been used in the auto and other industries for structural reinforcement, preventing corrosion and damping sound and vibration.

Generally, to be useful as reinforcing foams in automotive applications, it is desirable for rigid foams to have a good balance between density and physical properties such as compression strength. One way that has been tried to accomplish this is to use so-called syntactic foam. Syntactic foams are composites consisting of hollow microspheres (minute hollow bubbles, microbubbles, or microballoons) that are dispersed in a resinous matrix. These microspheres are commonly made from inorganic materials such as glass and silica; and polymeric materials such as epoxy resin, unsaturated polyester resin, silicone resin, phenolics, polyvinyl alcohol, polyvinyl chloride, polypropylene, and polystyrene. One example of syntactic foam known in the art to be used as structural foam is sold by Novamax industries under the tradename "Novacore". This product uses an epoxy as the continuous resinous matrix.

In these syntactic foams, the resinous matrix is typically substantially non-cellular. However, because the microspheres are hollow, their inclusion reduces the density of the syntactic foam. Thus, essentially all of the reduction in density (relative to that of the unfoamed epoxy matrix) is attributable to the gas contained in the microspheres. In some instances the epoxy matrix is expanded slightly by incorporating into it expandable plastic spheres and/or thermally decomposable blowing agents such as azodicarbonamide or p,p-oxybis(benzene sulphonyl hydrazide). However, the limit of expansion of these materials is usually 80% or less, and applied heat is required in order to obtain even this small amount of expansion.

Although one and two part epoxy-based syntactic foams have enjoyed some success as reinforcing foam in the auto industry, they suffer from some deficiencies. First, epoxy-based syntactic foams are cured by applying heat. In automotive applications, it is frequently difficult to supply sufficient heat to get the epoxy-based syntactic foams to cure throughout the part. Consequently, portions of the foam may be cured while other portions, especially the center of the foam, may be left uncured. Moreover, curing is often done in E-coat and paint cure ovens, which often do not maintain close control over curing temperatures. This can lead to incomplete fills or undercuring when oven temperatures are too low. Undercuring can lead to the foam having a low $T_g$, so that it becomes soft and loses its reinforcing effect when warm, such as under summertime conditions. Conversely, oven temperatures that are too high often lead to chemical reaction exotherms resulting in foam scorching, charring, overexpansion or even paint blistering if the exotherm is too high.

Second, epoxy-based syntactic foams are generally very brittle and thus lack fracture toughness. Therefore, these foams tend to shatter on impact (such as in a vehicle collision) or crack easily under stress.

Third, it is difficult to make a suitable epoxy-based syntactic foam at a density lower than about 27–35 pcf. At lower densities, those foams become extremely brittle. However, having a lower density is very important to automobile manufacturers, particularly when the vehicle contains a large amount of the reinforcing foam. The lower density translates into lower foam weight, thereby decreasing the overall weight of the vehicle. Reduced weight often correlates to lower fuel consumption and therefore, lower vehicle operating cost.

Rigid, non-syntactic polyurethane foams have also been used as reinforcing foams in automotive applications. These polyurethane foams are formed by the reaction of a polyisocyanate compound such as toluene diisocyanate (TDI) or diphenylmethane diisocyanate (MDI) or polymeric MDI with an isocyanate-reactive component, such as a polyol or water. Generally, streams of the isocyanate-reactive component and polyisocyanate are intermixed in a mixing head (together with a blowing agent, if water is not included in the formulation) and then dispensed into a cavity or mold. In the mold or cavity, the isocyanate-reactive component and the polyisocyanate react to form the polyurethane. Any water present in the formulation will react with the polyisocyanate to form carbon dioxide gas. The carbon dioxide gas causes the foaming mass to expand, resulting in a non-syntactic cellular structure.

These non-syntactic polyurethane foams have the advantage that they can be formed at very low densities, thereby decreasing the overall weight of the foam. However, the raw materials used to make these foams are typically liquids having a low viscosity, typically about 1000 cps or less. This causes a problem in automotive applications, because the reaction mixture is usually applied to structural members of the vehicle that are not primarily designed as molds for the foam. These structural members include vertical surfaces or cavities that are not completely sealed. For example, these members may contain openings such as trim attachment holes, unsealed seams, drain flutes and the like. Consequently, the low-viscosity reaction mixture readily leaks through any small openings in the cavity, or flows away from non-horizontal surfaces. In addition, it is often desired to reinforce only certain portions of a particular part. In order to accomplish this with these polyurethane foam formulations, it is necessary to install baffles or dams inside of the part or cavity to insure that the mixture is confined in the desired area. This adds considerable cost to the process.

One approach to overcoming these problems with polyurethane foams is to froth the reaction mixture. Frothing is typically done by mechanically whipping air or other gas into the polyurethane mixture using a high shear mixer. When a frothing method is utilized, leakage is reduced because the reaction mixture leaving the mix head has a creamy, more flow resistant consistency. However, a large enough quantity of gas must be whipped into the reaction mixture to create a flow resistant consistency, and this can ultimately result in a foam having too low a density to provide adequate reinforcement.

Another approach to solving these problems of polyurethane foams is to select highly reactive components so that the reaction mixture has extremely short gel time. However, these formulations tend to be highly exothermic, so precautions must be taken to prevent the heat generated during the reaction from producing temperatures high enough to cause foam scorching or even a foam fire. In addition, these highly reactive mixtures tend to split when used to make larger volume foams. Therefore, these highly reactive mixtures are often used to successively apply thin layers of polyurethane foam or in smaller amounts than are needed to fill the cavity. This greatly limits the range of applications for which these highly reactive mixtures are useful.

SUMMARY OF THE INVENTION

In one aspect, this invention is a polyurethane foam having a bulk density from about 7 to 35 pounds per cubic foot and a compressive modulus of at least 5,000 psi as measured by ASTM D 1621 for a 2"×2"×1" skinless core foam sample at a deflection rate of 0.1 inch/minute, said foam comprising a non-syntactic cellular polyurethane matrix having dispersed therein from about 5 to about 35 weight percent, based on the weight of the foam, of a syntactic phase comprising hollow microspheres. The foam of this aspect of the invention provides a unique combination of moderately low density and good physical characteristics, particularly compressive modulus. The foam is especially suitable for use as a reinforcing foam, especially for automotive applications, as it is easily foamed in place where reinforcement is needed and is easily formulated so that it does not require applied heat to cure.

In a second aspect this invention is a polyurethane foam made by (1) mixing under reaction conditions a high viscosity isocyanate-reactive component (a) and a high viscosity polyisocyanate component (b), wherein component (a) includes at least one polyol, a blowing agent and at least one thixotropic agent, and component (b) includes at least one polyisocyanate compound and at least one thixotropic agent, wherein one or both of components (a) and (b) contain a plurality of hollow microspheres, and (2) allowing the mixture to expand in place and cure.

Because the foam of the invention contains both microspheres and a cellular polyurethane matrix, the foam is easily made with a combination of desirable density and good physical properties, particularly compression modulus. As it is easily made from high viscosity components, it is easily applied to a variety of structures that require reinforcement. When applied, the high viscosity reaction mixture stays in place until it expands and cures to form the desired reinforcing foam. The reaction mixture generally cures without application of heat, thereby eliminating a costly heating step.

DETAILED DESCRIPTION OF THE INVENTION

The foam of the present invention includes both a continuous, non-syntactic, polyurethane foam phase and a syntactic phase. The continuous, non-syntactic, polyurethane foam phase is created by the chemical reaction of the aforementioned polyol and polyisocyanate components, together with the formation of gas from the blowing agent. The syntactic phase comprises hollow microspheres that are dispersed in the polyurethane foam matrix. The foam has a bulk density of from about 7 pounds per cubic foot (pcf), preferably from about 10 pcf, more preferably from about 15 pcf, to about 35 pcf, preferably to about 30 pcf, more preferably to about 25 pcf. The foam has a compressive modulus of at least 5000 psi, preferably at least 10,000 psi, more preferably at least 15,000 psi, to about 30,000 psi, more preferably to about 25,000 psi, as measured on a 2"×2"×1" skinless core sample of the foam at a deflection rate of 0.1 in/minute. The microsphere content of the foam is advantageously from about 5, preferably about 10, more preferably about 12 weight percent, to about 35, preferably about 30, more preferably about 20 percent of the total weight of the foam.

The reactive components of the foam are preferably expanded at least about 100%, more preferably at least 150%. The amount of expansion is determined in the following manner:

(a) the volume of the reactive components in the foam mixture is determined;
(b) the volume of the non-reactive components in the foam mixture is determined;
(c) the volume of the final foam is determined;
(d) the volume of the polyurethane matrix of the final foam is determined by subtracting the volume of the non-reactive components from the volume of the final foam, respectively; and
(e) calculating the % expansion using the formula $$\% \text{ Expansion} = [(V_e/V_i)-1] \times 100\%,$$

where $V_e$ is the volume of the polyurethane matrix of the final foam and $V_i$ is the volume of the reactive components in the foam mixture. The reactive components include polyols, water, crosslinkers, amine-initiated polyols, amine-functional materials and polyisocyanates, all as described more fully below. Non-reactive components include all other materials that do not react into the polymer network, including microspheres, catalysts, thixotropic agents, surfactants, fillers, non-reactive plasticizers and the like.

The foam of the invention is conveniently made by reacting a high viscosity isocyanate-reactive component with a high viscosity polyisocyanate component. Each component is sufficiently high in viscosity (at low or zero shear) that when the components are mixed, the uncured reaction mixture exhibits minimal or preferably no flow under the force of gravity and in the absence of shear at application temperatures of about 60–100° F. Preferably, the viscosity and compatibility of each component is also such that there is substantially no separation of liquid and solid (filler) ingredients over a prescribed period, such as three months or longer at 50–100° F.

These requirements are generally met when the isocyanate-reactive component has a Brookfield viscosity (#7 spindle, 25° C., 10 rpm) of from about 50,000 cps, preferably from about 100,000 cps, more preferably from about 125,000 cps, most preferably from about 150,000 cps to about 400,000 cps, preferably to about 300,000 cps, more preferably to about 250,000 cps. The polyisocyanate component suitably has a Brookfield viscosity (same conditions) of from about 50,000 cps, preferably about 100,000 cps, more preferably 150,000 cps most preferably about 200,000 cps to about 400,000 cps, preferably to about 300,000 cps, more preferably to about 250,000 cps.

The polyol component and the polyisocyanate component preferably have similar viscosities. If the components have significantly different viscosities, then effective mixing and dispensing becomes more difficult. Generally, the difference between the viscosity of the polyol component and the viscosity of the polyisocyanate component is no greater than about 150,000 cps, more preferably no greater than about 100,000 cps and most preferably no greater than about 50,000 cps.

The high viscosity isocyanate-reactive component includes at least one polyol, a blowing agent and a thixotropic agent. It will usually contain a surfactant, and may contain other additives as described below.

The polyol is one or more compounds having at least two isocyanate-reactive hydroxyl groups per molecule. As is discussed more fully below, mixtures of two or more polyols together with other isocyanate-reactive compounds are preferred. In general, suitable polyols include compounds nominally having from about 2 to about 8 isocyanate-reactive hydroxyl groups per molecule. The hydroxyl equivalent weight of the individual polyols may range from about 31 to about 2000 or more. Suitable polyols include compounds such as alkylene glycols (e.g., ethylene glycol, propylene glycol, 1,4-butane diol, 1,6 hexanediol and the like), glycol ethers and polyethers (such as diethylene glycol, triethylene glycol, dipropylene glycol, tripropylene glycol and the like), glycerine, trimethylolpropane, tertiary amine-containing polyols such as triethanolamine, triisopropanolamine, and ethylene oxide and/or propylene oxide adducts of ethylene diamine, toluene diamine and the like, polyether polyols, polyester polyols, and the like. Among the suitable polyether polyols are polymers of alkylene oxides such as ethylene oxide, propylene oxide and 1,2-butylene oxide or mixtures of such alkylene oxides. Such polyether polyols have a hydroxyl equivalent weight of from about 200 to about 2000 or more. Preferred polyethers are polypropylene oxides or polymers of a mixture of propylene oxide and a small amount (up to about 12 weight percent) ethylene oxide. These preferred polyethers may be capped with up to about 30% by weight ethylene oxide.

Polyester polyols are also suitable. These polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols preferably have an equivalent weight of about 150 or less, and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols such as those sold by Union Carbide Corporation under the trade name "Tone" are also useful.

Aromatic polyester polyols are a preferred type of polyol to use as a primary polyol ingredient of the isocyanate-reactive component, because they provide good rigidity to the foam at a given molecular weight. The preferred aromatic polyester polyols include esters of orthophthalic acid or orthophthalic anhydride and a glycol or glycol ether such as ethylene glycol or diethylene glycol. The preferred aromatic polyester polyols have a nominal functionality of about 2.0 and an equivalent weight from about 125–225, more preferably about 150–200. These aromatic polyester polyols are characterized in having a relatively high Brookfield viscosity, such as from about 2000 to 3000 cps @ 25° C.

It is also preferred to employ, in conjunction with the preferred aromatic polyester polyol, one or more very low (up to about 125) equivalent weight tri- or higher-functional polyols. These polyols are often referred to as "crosslinkers". Among these are glycerine, trimethylolpropane, and the like. These crosslinkers generally comprise a minor amount by weight of the isocyanate-reactive component, such as from about 2 to about 40 weight percent, based on the weight of the aromatic polyester polyol.

In order to impart toughness to the foam, a minor amount of a high (i.e. 800 or higher, preferably about 1500–3000) equivalent weight polyol may be added to the isocyanate-reactive component, as well. This high equivalent weight polyol is preferably a polyether polyol having two to three hydroxyl groups per molecule. It more preferably is a poly(propylene oxide) that may be end-capped with up to 30% (by weight of the compound) of poly(ethylene oxide). A particularly preferred high equivalent weight polyol contains dispersed polymer particles. These materials are commercially known and are commonly referred to as "polymer polyols" (or, sometimes "copolymer polyols"). The dispersed polymer particles may be, for example, polymers of a vinyl monomer (such as styrene, acrylonitrile or styrene-acrylonitrile particles), polyurea particles or polyurethane particles. Polymer or copolymer polyols containing from about 2 to about 50% or more by weight dispersed polymer particles are suitable. When used, this polymer or copolymer polyol may constitute up to about 45%, preferably from about 5 to about 40%, of the weight of all isocyanate-reactive materials in the isocyanate-reactive component.

It is preferred to incorporate at least a small amount of a tertiary amine-containing polyol in the isocyanate-reactive component. The presence of this tertiary amine-containing polyol tends to increase the reactivity of the isocyanate-reactive component during the early stages of its reaction with the polyisocyanate. This in turn helps the reaction mixture to build viscosity more quickly when first mixed and applied, without unduly decreasing cream time, and thus reduces run-off or leakage. Such tertiary amine-containing polyols include, for example, triisopropanol amine, triethanolamine and ethylene and/or propylene oxide adducts of ethylene diamine having a molecular weight of up to about 400. The tertiary amine-containing polyol advantageously constitutes up to about 10, preferably up to about 5 percent of the combined weight of all isocyanate-reactive materials in the isocyanate-reactive component.

The isocyanate-reactive component may further comprise a small quantity of an amine-functional compound having one or more terminal isocyanate-reactive amine groups. These include polyols having a primary or secondary amine group, such as monoethanolamine, diethanolamine, monoisopropanolamine, diisopropanol amine and the like, and aliphatic amines such as aminoethylpiperazine. Also included among these compounds are the so-called aminated polyethers in which all or a portion of the hydroxyl groups of a polyether polyol are converted to primary or secondary amine groups. Suitable such aminated polyethers are sold by Huntsman Chemicals under the trade name JEFFAMINE®. Typical conversions of hydroxyl to amine groups for these commercial materials range from about 70–95%, and thus these commercial products contain some residual hydroxyl groups in addition to the amine groups. Preferred among the aminated polyethers are those having a weight per isocyanate-reactive group of about 100–1700, and having 2–4 isocyanate-reactive groups per molecule. These amine-containing materials advantageously constitute no greater than about 5 weight percent, preferably from about 0.25 to about 2 weight percent of the total weight of the isocyanate-reactive component. When used in such small amounts, these components also contribute to a fast initial viscosity build, without unduly decreasing cream time.

In order to make the desired rigid foam, the isocyanate reactive materials used in the isocyanate-reactive component preferably have an average nominal functionality of from about 2.2 to about 8, preferably from about 2.5 to about 5.0, most preferably from about 2.5 to about 4.0 isocyanate-reactive hydroxyl groups per molecule. In addition, the equivalent weight (weight per equivalent of isocyanate-reactive groups) of the fully formulated isocyanate-reactive component is advantageously from about 100 to about 300, preferably from about 150 to about 250. Accordingly, the functionality and equivalent weight of the individual polyols are preferably selected so the foregoing parameters are met.

In addition, the selection of polyols influences the reactivity of the isocyanate-reactive component with the polyisocyanate. In general, primary hydroxyl groups are more reactive with a polyisocyanate than are secondary hydroxyl groups. However, polyols that contain amine groups tend to be autocatalytic.

The isocyanate-reactive component also contains a blowing agent. Although physical blowing agents such as fluorocarbons, hydrofluoro-carbons, chlorocarbons, chlorofluorocarbons, hydrochlorofluorocarbons can be used, the preferred blowing agent is water. Water reacts with the polyisocyanate to form carbon dioxide gas that causes the reaction mixture to expand. The blowing agent is used in an amount sufficient to provide the foam with the aforementioned densities. Preferably, enough blowing agent is used to expand the reactive components of the formulation (i.e., the non-syntactic phase, excluding the microspheres, fillers and other non-reactive materials) at least about 100%, more preferably 150%, relative to the volume of the unfoamed reactive raw materials, as described before.

When water is used as the blowing agent, about 0.2 to about 2, preferably from about 0.4 to about 1.5 parts by weight are used per 100 parts of other isocyanate-reactive materials in the isocyanate-reactive component.

The isocyanate-reactive component additionally contains a thixotropic agent in an effective amount. The thixotropic agent is a material that imparts shear-sensitive viscosity, i.e. the isocyanate-reactive component containing the thixotropic agent exhibits a lower viscosity when under shear than it exhibits under no or low shear conditions. This characteristic permits the isocyanate-reactive component to be more easily blended with the polyisocyanate component despite the relatively high viscosities of each. At the same time, this characteristic causes the resulting reaction mixture to reassume a high viscosity once it is dispensed and no longer subject to shearing forces, thus controlling the amount of flow from the area and through holes or poorly sealed seams Suitable thixotropic agents include fumed silica and certain clays such as bentonite clay and montmorillonite clay. Fumed silica is a preferred thixotropic agent, and hydrophobic forms of fumed silica are most preferred. The thixotropic agent is used in an effective amount, for example about 0.5 to about 5, preferably from about 1 to about 3 percent of the total weight of the isocyanate-reactive component The aforementioned polyols, amine-terminated compounds and water tend to have individual viscosities of about 20,000 cps or less, and often less than 5000 cps. Although the thixotropic agent tends to increase the viscosity, it is usually necessary to include a filler in order to achieve the necessary minimum viscosity described above. Accordingly, in order to obtain the necessary minimum viscosity, the isocyanate-reactive component will usually contain a filler or other material that increases its viscosity. This is preferably accomplished by loading the isocyanate-reactive component with hollow microspheres, although other filler materials can be used alone or in conjunction with the microspheres. When the preferred hollow microspheres are used, they generally constitute from about 5%, preferably from about 15%, more preferably from about 20% to about 40%, preferably to about 35%, more preferably to about 30% percent of the total weight of the isocyanate-reactive component. Other fillers can be used in similar amounts.

Suitable microspheres include those made from inorganic materials such as glass and silica-alumina ceramics or polymeric materials such as epoxy resin, unsaturated polyester resin, silicone resin, phenolics, polyvinyl alcohol, polyvinyl chloride, polypropylene, and polystyrene. In addition, fly ash that is in the form of hollow particles can be used. Examples of commercially available fly ash of this type is sold by Boliden Intertrade, Inc., under the trade names Fillite 100 and Fillite 150. Glass microspheres are most preferred. These microspheres most advantageously have average diameters of from about 5 to about 150 microns, preferably from about 20 to about 85 microns. The microspheres advantageously have a burst pressure sufficient to withstand the forces imposed upon them during the formulation, mixing and dispensing processes. Microspheres having an 80% or greater survival rate when exposed to at least 750 psi are preferred, and those having an 80% or greater survival rate when exposed up to 5500 psi are more preferred. In addition, the microspheres advantageously have a bulk density of from about 0.1 to about 0.5 g/cc.

If desired, the microspheres may be surface treated with an interfacial adhesion promoter such as a silane compound.

In addition to providing increased viscosity and reducing the bulk density of the foam, the hollow microspheres may also act as nucleation sites for the generation of cells in the polyurethane foam matrix. The microspheres also serve as a reinforcing filler to provide increased compressive modulus.

Other fillers can be used in addition to, or less preferably in place of, the microspheres. However, at least one of the isocyanate-reactive and polyisocyanate components must contain the microspheres. A non-exhaustive list of suitable alternative or supplemental fillers includes talcs, clays, silicas, calcium carbonates, graphites, glass, carbon black, plastic powders such as ABS, and the like. Fibers such as glass or other ceramics, carbon, metals, or polymers such polyamide (i.e., Kevlar), propylene or the like are also useful fillers. Fibers preferably have an aspect ratio of at least 5, preferably at least 20, and should be well-dispersed in the polyurethane matrix.

The isocyanate-reactive component may also contain auxiliary additives that promote the formation of a good quality, stable foam. Such additives include, for example, catalysts, surfactants, pigments, plasticizers, and the like. Suitable catalysts include the well known polyurethane catalysts such as are described at column 6 of U.S. Pat. No. 5,817,860, incorporated herein by reference. Preferred catalysts include salts and chelates of tin, zinc, bismuth, iron, mercury and the like, as well as tertiary amine compounds. Organotin catalysts such as stannous octoate, stannous oleate, stannic chloride, dimethyltin dilaurate and dibutyltin dilaurate are preferred metallic catalysts. A preferred tertiary amine catalyst is triethylenediamine, which is commercially available as a 33% by weight solution. Other suitable tertiary amine catalysts include trimethylamine, triethylamine, N-methylmorpholine, N,-ethylmorpholine, N,N-dimethylbenzylamine, N,N-dimethylethanolamine, N,N-dimethylpiperazine, 1,4-diazobicyclo[2,2,2]octane, bis(dimethylaminoethyl)ether, bis(2-dimethylaminoethyl) ether, morpholine, N,N-dimorpholine diethylether, N,N-dimethylcyclohexylamine and 4,4'-(oxydi-2,1-ethanediyl) bis.

Catalysts that can be stably dispersed in the polyisocyanate may instead or in addition be used in the polyisocyanate component.

The amount of catalyst is selected to provide a desired reaction rate. Generally, a relatively slow rate is desired, as this facilitates the dispensing of large shots of the mixture in large cavities, facilitates longer static mixer life and/or it minimizes the amount of purging necessary to keep the mixer free of cured material. Sufficient catalyst to provide a cream time (start of foam rise) of about 3–5 minutes, a gel time of about 6–12 minutes and tack free time of about 13–20 minutes is preferable.

Suitable surfactants include the well-known silicone surfactants. These include commercially available polysiloxane/polyether copolymers such as Tegostab (trademark of Goldschmidt Chemical Corp.) B-8462 and B-8404, and DC-198 and DC-5043 surfactants available from Dow Corning.

A preferred isocyanate-reactive component is formulated from a mixture of components as follows:

125–250 equivalent weight, 2–8 functional polyester or polyether base polyol, 15–85% by weight; 800–3000 equivalent weight 2–4 functional polyether polyol, 10–30% by weight; 125 or less equivalent weight crosslinker, 2–15% by weight; amine-initiated polyether polyol, 0–5% by weight; amine-functional compound, 0–2% by weight; water, 0.2 to 1.5% by weight; microspheres, 15–40% by weight; thixotropic agent, 1 to 3% by weight; the isocyanate-reactive component may also contain auxiliary components such as one or more catalysts and one or more surfactants.

A more preferred isocyanate-reactive component is formulated from a mixture of components as follows: 125–250 equivalent weight, aromatic polyester polyol, 15–40% by weight; 800–2000 equivalent weight 2–4 functional polyether polyol containing dispersed polymer particles, 15–30% by weight; 125 or less equivalent weight crosslinker, 4–10% by weight; amine-initiated polyether polyol, 1–4% by weight; amine-functional compound, 0.25–2% by weight; water, 0.4 to 1.2% by weight; microspheres, 15–30% by weight; thixotropic agent, 1 to 3% by weight; and effective amounts of one or more auxiliary components such as one or more catalysts and one or more surfactants.

The polyisocyanate component comprises a polyisocyanate compound and a thixotropic agent. Suitable polyisocyanates include those commonly used in preparing polyurethanes, including aromatic, aliphatic and cycloaliphatic polyisocyanates. Aromatic polyisocyanates are generally preferred based on cost, availability and properties. Exemplary polyisocyanates include, for example, m-phenylene diisocyanate, 2,4- and/or 2,6-toluene diisocyanate (TDI), the various isomers of diphenymethanediisoyanate (MDI), hexamethylene 1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"-triphenylmethane diisocyanate, polymethylene polyphenylisocyanate, toluene-2,4,6-trilsocyanate, and 4,4'-dimethyldiphenylmethane-2,2',5,5'-tetraisocyanate. Preferred polyisocyanates include TDI, MDI and the so-called polymeric MDI products, which are a mixture of polymethylene polyphenylisocyanates in monomeric MDI. Especially suitable polymeric MDI products have a free MDI content of from about 5 to about 40% by weight, more preferably about 10 to about 25% by weight, and have an average functionality (number of isocyanate groups per molecule) of about 2.8 to 4.0, more preferably about 2.7 to about 3.4. Such polymeric MDI products are available from The Dow Chemical Company under the trade name PAPI®.

In addition to the foregoing polyisocyanates, prepolymers and quasi-(or semi-) prepolymers thereof are useful and even preferred. Of particular interest are prepolymers or quasi-prepolymers of polymeric MDI products, which prepolymers have an MDI content of less than about 20, preferably less than about 10, especially less than about 6 weight percent. The prepolymers or quasi-prepolymers of interest more suitably have an isocyanate equivalent weight of from about 175–500, especially about 200 to about 350. These prepolymers are conveniently made by reacting an excess of the polyisocyanate with a polyol. These prepolymers have a low free MDI content, so their use substantially reduces the risks of MDI inhalation exposure. Thus, by using the prepolymer approach to reduce the level of free MDI, costly engineering controls such as proper downdraft ventilation can be substantially reduced or potentially eliminated.

A polyisocyanate of particular interest is a quasi-prepolymer prepared in the reaction of an organic polyisocyanate, especially polymeric MDI, with a small quantity of a monoalcohol and a polyol that has an average nominal functionality of about 1.8 to about 3.0. In making a quasi-prepolymer useful herein, the NCO:OH ratio ranges from about 2.5 to about 5, preferably to about 4, and the equivalent ratio of monoalcohol to polyol is from about 1.75 to about 3.25, especially from about 2.25 to about 2.75. The quasi-prepolymer preferably has a functionality of at least about 2.0 to about 3.0 and an NCO content of about 10–20% by weight. Among the quasi-prepolymers of this general type are those described in U.S. Pat. No. 5,817,860, incorporated herein by reference.

The polyisocyanate component also includes an effective amount of a thixotropic agent of the type discussed before. As before, fumed silica is a preferred thixotropic agent and hydrophobic types of fumed silica are especially preferred. A suitable amount is from about 0.5 to about 5, preferably from about 1 to about 3 percent of the total weight of the polyisocyanate component.

As with the isocyanate-reactive component, it is usually necessary to incorporate a filler into the polyisocyanate component in order to attain the necessary viscosity. Suitable fillers for the polyisocyanate component are the same as can be used in the isocyanate-reactive component, with the hollow microspheres discussed above being highly preferred. The amount of filler is selected so that the aforementioned viscosity is attained. For hollow microspheres, this is generally accomplished when the microspheres constitute about 5, preferably about 10, more preferably about 12 weight percent, to about 35, preferably about 25, more preferably about 20 percent of the total weight of the polyisocyanate component. Other fillers can substitute for all or a portion of the microspheres, as discussed with respect to the isocyanate-reactive component.

Note that at least one of the two reactive components, i.e., one of the isocyanate-reactive component and the polyisocyanate component, must contain hollow microspheres. However, the concentration of microspheres in each component need not be equal and can be significantly different if necessary to desirably control component viscosity, the —NCO/OH stoichiometric mix ratio, volume ratios of the two components, and the like.

In addition, the polyisocyanate component may contain various optional ingredients such as catalysts, colorant (i.e. pigments or dies), plasticizers, surfactants, blowing agents and the like. Suitable plasticizers include phthalate esters such as dioctyl phthalate, dimethyl phthalate, dibutyl phthalate, mixtures of such phthalate esters such as are sold by BASF Corporation under the trade name PALATINOL®; phosphate esters such as tributyl phosphate, triphenyl phosphate and cresyl diphenyl phosphate, chlorinated biphenyls, and aromatic oils. The amount of plasticizer may range from about 1, preferably about 10, to about 50, preferably about 25 percent of the weight of the polyisocyanate component.

Preferably, at least one of the components will contain a pigment, and the other has either no pigment or a pigment of a different color. A preferred pigment is carbon black, which is used in only one of the components. The use of a pigment in this manner provides a simple visual method for detecting incomplete mixing of the isocyanate-reactive and polyisocyanate components, or off-ratio mixing. For example, if carbon black is used in the polyisocyanate component, then proper mixing will result in a uniformly gray mixture. A mixture that is too white implies that the mixture is polyol rich. A mixture that is too black implies that the mixture is too rich in polyisocyanate. A mixture that has streaks would imply poor mixing.

Foam according to the invention is prepared by mixing the isocyanate-reactive and polyisocyanate components and applying the thus-formed reaction mixture to/into the part/cavity to be reinforced. Because of the high viscosity of the isocyanate-reactive and polyisocyanate components, mixing is conveniently done by forcing them through a static mixer. The length, diameter, materials of construction, the number and design of the elements contained in these static mixers vary depending upon vendor design, but they all generally work on the principles of dividing and recombining materials flowing through them. Because both the isocyanate-reactive and polyisocyanate components are thixotropic, the shear introduced by the dispensing equipment and the static mixer operates to somewhat reduce the viscosity of the components, thus facilitating better, easier mixing.

The ratios of the two components are advantageously selected so as to provide an isocyanate index (ratio of NCO to isocyanate-reactive groups) of about 0.7, preferably about 0.9, more preferably about 0.98, to about 1.5, preferably to about 1.25, more preferably about 1.1. It is especially preferred to formulate the isocyanate-reactive and polyisocyanate components so that these isocyanate indices are achieved using comparable volumes of each component. Preferably, the isocyanate-reactive component and the isocyanate component are mixed in a volume ratio of from about 4:1 to 1:4, preferably about 3:1 to 1:3, more preferably from about 2:1 to 1:2, most preferably about 1:1 to about 1:2. This facilitates the dispensing of the components in an industrial setting, and allows for the use of simpler mixing and dispensing equipment. For example, the isocyanate-reactive component and the polyisocyanate component are conveniently packaged in commercially available cartridges. These cartridges are used in conjunction with a dispensing gun that is adapted to dispense both components from their respective cartridges, through a static mixer, and onto/into the area being reinforced. Having the volumes of the two components being equal or in simple multiples of each other facilitates packaging the components in cartridges in this manner.

The temperature of mixing and foaming is conveniently from about 50 to about 100° F., although somewhat higher temperatures can be tolerated.

In order for efficient foaming to take place, nucleating sites are advantageously provided. This is most conveniently done by dispersing a quantity of air, nitrogen, carbon dioxide or other inert gas into one or both of the isocyanate-reactive and polyisocyanate components. Dispersed gasses provide effective nucleation when they constitute at least about 2 volume percent (at STP) of the reaction mixture, preferably, at least about 4 volume percent of the reaction mixture. Generally, no more than about 15 volume percent of dispersed gasses are used and preferably, no more than about 12 volume percent of dispersed gasses are used.

Nucleating gasses can be dispersed into the reaction mixture as the isocyanate-reactive and polyisocyanate components are mixed and dispensed. However, it is preferred to disperse the gas into one and preferably both components prior to mixing. It is highly preferred to disperse similar volumes of gas into each component. This avoids mixing problems associated with mixing components having significantly different contents of dispersed gasses. Preferably, the percentage of dispersed air content should not differ between the two components by more than 8 percentage points. More preferably, the percentage of dispersed air content in the two components should not differ by more than 5 percentage points.

Because of the high viscosity of each of the isocyanate-reactive and polyisocyanate components, gas can be dispersed into either or both, preferably both, of the components as each are manufactured. The dispersed gas forms microscopic air bubbles that, due to the high viscosity of the components, tend to be stable (i.e. they do not substantially coalesce to form fewer, larger air bubbles) over a period of months or more.

Once the reaction mixture is formed, it is dispensed and allowed to react to form a foam. When a specific structural member is to be reinforced, the reaction mixture is conveniently dispensed on or into the member at the point where reinforcement is desired. Alternately, the foam can be formed separately and then glued or otherwise attached to the structural member. It is usually not necessary to apply heat to effect a full expansion and cure.

The syntactic/non-syntactic foam of the invention can be used in a variety of applications to structurally stiffen or reinforce areas to which it is applied. Load beams, pillars, rocker panels, roof rails and headers, cross members, and the like are examples of automotive body structural components that benefit from reinforcement from the foam of this invention. Many of these components are hollow. In some instances, the entire cavity will be filled by the foam. In other instances, the cavity may be only partially filled to provide increased stiffness or reinforcement in some localized area. In other instances, the foam of the invention may be applied to an area where two structural members meet, such as where vertical structural members meet horizontal structural members.

The following examples are provided to illustrate the invention, but are not intended to limit the scope thereof. All parts and percentages are by weight unless otherwise indicated.

EXAMPLES 1–3

A. Formulation of Isocvanate-reactive Component

Isocyanate-reactive components A, B and C are prepared from the ingredients indicated in Table 1:

TABLE 1

| Ingredient | A (pbw) | B (pbw) | C (pbw) |
| --- | --- | --- | --- |
| Polyester Polyol[1] | 37.62 | 31.85 | 33.22 |
| Polymer Polyol A[2] | 18.5 | 25.0 | 0 |
| Polymer Polyol B[3] | 0 | 0 | 18.5 |

TABLE 1-continued

| Ingredient | A (pbw) | B (pbw) | C (pbw) |
|---|---|---|---|
| 33% triethylene diamine solution[4] | 0.03 | 0 | 0.03 |
| Polyether Polyol A[5] | 0 | 0 | 5.0 |
| Glycerol | 7.8 | 7.0 | 7.0 |
| Amine-initiated polyol[6] | 2.0 | 4.0 | 2.0 |
| Glass Microspheres[7] | 26.0 | 24.0 | 26.0 |
| Surfactant A[8] | 3.0 | 0 | 3.0 |
| Surfactant B[9] | 0 | 3.0 | 0 |
| Water | 0.80 | 0.9 | 0.85 |
| Aminated Polyether[10] | 1.75 | 1.75 | 1.75 |
| Fumed Silica[11] | 2.5 | 2.5 | 2.5 |

[1]Stepanpol 3152, a 356 MW aromatic polyester diol sold by Stepan Company; [2]A 4300MW EO-capped poly(propylene oxide) nominal triol containing 40% dispersed styrene-acrylonitrile particles; [3]Specflex™ NC-700 polyether polyol, sold by The Dow Chemical Company; [4]Dabco 33LV; 33% triethylenediamine, 67% dipropylene glycol, sold by Air Products; [5]Voranol™ 490 polyol, a 490 MW rigid foam polyol sold by Dow Chemical; [6]Voranol™ 800, a 280 MW amine-initiated tetrol sold by Dow Chemical; [7]VS500 glass microspheres, sold by 3M Company; [8]Tegostab B-8404, sold by Goldschmidt Chemical Corporation; [9]Tegostab B-8462, sold by Goldschmidt Chemical Corporation; [10]Jeffamine™ T-403, a 440 MW nominally trifunctional aminated polyether; [11]Cab-O-Sil TS-720, Cabot Corporation.

Isocyanate-reactive compositions A, B and C are prepared by mixing all components except water and fumed silica in a Ross mixing vessel for 15 minutes at 60 rpm. The water and fumed silica are then added and mixed for additional 15 minutes at 60 rpm and a partial vacuum of 10 inches of mercury. The water content of the composition is then measured and adjusted as necessary to the water contents indicated in Table 1. The mixture is then mixed an additional 15 minutes at 60 rpm and a partial vacuum of 10 inches of mercury. Isocyanate-reactive component A has a Brookfield viscosity of 151,000 cps at 25° C., number 7 spindle, 10 rpm and contains 9.4 volume % air. Isocyanate-reactive component B has a Brookfield viscosity, same conditions, of 208,000 cps and contains 7.5 volume % air. Isocyanate-reactive component C has a Brookfield viscosity, same conditions, of 200,000 cps and contains 11.9 volume % air.

B. Polyisocyanate Component Preparation

Polyisocyanate component A is made by mixing 7.8 parts of a 430 MW polyoxypropylene diol (Voranol™ 220–260, available from the Dow Chemical Company), 6.95 parts of n-butanol, 65.23 parts of a polymeric MDI having a free MDI content of about 20% and an isocyanate functionality of about 3.2 (PAPI™ 20, from The Dow Chemical Company), 20 parts of Palatinol 711P phthalic ester mixture and 0.013 parts of an organotin catalyst (Dabco T-9, from Air Products) in a Ross mixing vessel for 30 minutes at 25° C. at 60 rpm under a nitrogen pad, followed by mixing for an additional 60 minutes at 70° C. and 60 rpm. 83.98 parts of the resulting prepolymer are mixed with 0.025 parts carbon black (Monarch 120, from Cabot Corporation) and 14.0 parts VS5500 glass microspheres in a Ross mixing vessel at 70° C. and 60 rpm, with cooling to 35° C. When the temperature reaches 35° C., 2 parts of Cab-O-Sil TS-720 fumed silica are added, and the resulting mixture is stirred at 60 rpm for an additional 15 minutes under a vacuum of 10 inches of mercury. Polyisocyanate component A has a Brookfield viscosity of 250,000 cps (spindle 7, 25° C., 10 rpm). It contains 5.6 volume % air.

Polyisocyanate component B is made in a similar manner. The ingredients used to make the prepolymer are 7.56 parts of Voranol 220–260 polyol, 6.74 parts n-butanol, 63.19 parts of PAPI 20 polymeric MDI, 22.5 parts of the Palatinol 711P phthalic ester mixture and 0.013 parts of the T-9 catalyst. 82.97 parts of the prepolymer are blended with 0.03 parts of Monarch 120 carbon black, 15 parts of VS5500 glass microspheres and 2 parts of Cab-O-Sil fumed silica in the same manner. Polyisocyanate B has a Brookfield viscosity, under the conditions specified above, of 216,000 cps and contains 4.6 volume % air.

C. Foam Preparation

Polyurethane foam Example 1 is prepared by mixing Polyisocyanate Component A and isocyanate-reactive component A at a 2:1 volume ratio at room temperature, and allowing 285 grams of the mixture to cure for 24 hours in a 16 ounce cup. Example 1 has a free rise density of 22.9 pounds per cubic foot. A 2"×2"×1" skinless sample of the foam is tested for modulus on an Instron machine at a deflection rate of 0.1 inch/minute. The compressive modulus is 16,800 psi.

Polyurethane foam Example 2 is prepared by mixing Polyisocyanate Component B and Isocyanate-reactive component B at a 2:1 volume ratio in the same manner as Example 1 is prepared. Example 2 also has a free rise density of 23.7 pounds per cubic foot. The compressive modulus at a deflection rate of 0.1 inch/minute is 10,844 psi.

Polyurethane foam Example 3 is prepared by mixing Polyisocyanate Component A and Isocyanate-reactive Component C at a 2:1 volume ratio in the manner just described. Example 3 has a free rise density of 23.3 pounds per cubic foot. The compressive modulus at a deflection rate of 0.1 inch/minute is 18,233 psi.

EXAMPLE 4

Isocyanate-reactive Component D is made in the same general manner as are Isocyanate-reactive Components A, B and C, using the components listed in Table 2. It has a Brookfield viscosity, under the conditions described above, of 89,600 cps. It contains 5.2 volume % air.

TABLE 2

| Ingredient | pbw |
|---|---|
| Polyester Polyol[1] | 19.85 |
| Polymer Polyol A[2] | 27.5 |
| Polyether polyol A[3] | 22.5 |
| Glycerol | 3 |
| Amine-initiated polyol[4] | 2.0 |
| Glass Microspheres[5] | 22.0 |
| Surfactant B[6] | 1.0 |
| Water | 0.4 |
| Aminated Polyether[7] | 1.0 |
| Fumed Silica[8] | 0.75 |

[1]Stepanpol 3152, a 356 MW polyester diol sold by Stepan Company; [2]A 4300MW EO-capped poly(propylene oxide) nominal triol containing 40% dispersed styrene-acrylonitrile particles; [3]Voranol™ 490 polyol, a 490 MW rigid foam polyol sold by Dow Chemical Company; [4]Voranol 800, a 280 MW amine-initiated tetrol sold by Dow Chemical; [5]VS500 glass microspheres, sold by 3M Company; [6]Tegostab B-8462, sold by Goldschmidt Chemical Corporation; [7]Jeffamine™ T-403, a 440 MW nominally trifunctional aminated polyether, [8]Cab-O-Sil TS-720, Cabot Corporation.

Polyisocyanate component C is prepared by mixing 74.9 parts of PAPI™ 20 polymeric MDI, 0.1 part of Monarch 120 carbon black, 24 parts of VS5500 glass microspheres and 1 part of Cab-O-Sil TS-720 fumed silica. Polyisocyanate Component C has a Brookfield viscosity, under the conditions described above, of 129,000 cps and contains 3.8 volume % air.

Polyurethane foam Example 4 is made from Polyisocyanate Component C and Isocyanate-reactive Component D in the same manner as Examples 1–3, except the volume ratio is 1:1 (isocyanate index 1.12). The foam has a free rise density of 19 pcf and a compressive modulus of 19,319 psi.

What is claimed is:

1. A process for making a polyurethane foam, comprising (1) mixing under reaction conditions a high viscosity isocyanate-reactive component (a) and a high viscosity polyisocyanate component (b), wherein component (a) includes at least one polyol, a blowing agent and at least one thixotropic agent, component (b) includes at least one polyisocyanate compound and at least one thixotropic agent, wherein one or both of components (a) and (b) contain a plurality of hollow microspheres, and wherein each of said component (a) and component (b) has a Brookfield viscosity (spindle 7, 25° C., 10 rpm) of at least about 50,000 cps (50 Pa.s), and (2) allowing the mixture to expand in place and cure.

2. The process of claim 1, wherein the blowing agent comprises water.

3. The process of claim 2, wherein component (a) contains from about 15 to about 30% by weight hollow microspheres and component (b) contains from about 12 to about 25% by weight hollow microspheres.

4. The process of claim 3, wherein the thixotropic agent is fumed silica.

5. The process of claim 4, wherein component (a) contains from about 15–40% by weight of an aromatic polyester polyol having an equivalent weight of about 125–225.

6. The process of claim 5, wherein component (a) further contains from about 4 to about 10% by weight of a crosslinker having an equivalent weight of below 125.

7. The process of claim 6, wherein component (a) further contains from about 1 to about 4% by weight of an amine-initiated polyol.

8. The process of claim 7, wherein component (a) further contains from about 0.25 to about 2% of an amine-functional compound.

9. The process of claim 8, wherein component (a) further contains from about 10 to about 30% by weight of a 800–3000 equivalent weight, nominally 2–4 functional polyether polyol.

10. The process of claim 3, wherein component (b) comprises a prepolymer of polymeric MDI, said prepolymer having a free MDI content of less than about 6% by weight and an isocyanate equivalent weight of about 200 to about 350.

11. The process of claim 2 wherein in step (2), the mixture is dispensed on to or into a structural member and allowed to expand in place and cure.

12. The process of claim 11 wherein the structural member is an automotive body structural component.

13. The process of claim 12 wherein the automotive body structural member includes a hollow cavity, and the mixture is dispensed into the cavity where it is allowed to expand in place and cure.

14. The process of claim 12 wherein the automotive body structural member is a load beam, pillar, rocker panel, roof rail, header or cross member.

15. The process of claim 2 wherein the isocyanate-reactive component and the polyisocyanate component are mixed by forcing them through a static mixer.

16. The process of claim 15 wherein in step (2), the mixture is dispensed on to or into a structural member and allowed to expand in place and cure.

* * * * *